3,494,782
ACOUSTICAL TILE-VINYL FACED ACOUSTICAL
TILE SPRAY COATING METHOD
Vincent de P. Clark, Newark, and Richard F. Shannon, Lancaster, Ohio, assignors to Owens-Corning Fiberglas Corporation, a corporation of Delaware
No Drawing. Continuation-in-part of application Ser. No. 447,519, Apr. 12, 1965. This application Jan. 13, 1966, Ser. No. 520,346
Int. Cl. C03c 25/00; C04b 43/02
U.S. Cl. 117—72                                6 Claims

ABSTRACT OF THE DISCLOSURE

A vinyl-faced fibrous acoustical insulating member and a process for making it are disclosed. The process comprises compacting a mat of glass fiber and a resinous binder, coating at least one surface of the board-like member with a conventional acoustical paint and then applying a thermoplastic vinyl overspray. The vinyl overspray has incorporated therein as an anti-tack material 5 to 20 percent by weight of inert particles selected from the group consisting of silica sol, silica smoke, titania sol, hydrated silica, calcium carbonate, hard polyvinyl resin particles and talc. The coating dispersion can optionally contain an alkaline salt of a fatty acid.

---

This application is a continuation-in-part of Ser. No. 447,519, field Apr. 12, 1965, and now abandoned.

This invention relates to vinyl-faced acoustical vitreous fibrous articles and to the method for producing such articles. More particularly, the invention is directed to novel coating formulations and to fibrous glass acoustical articles faced therewith and to the method for preparing same.

The use of mats, bats, tiles and board-like structures composed of sound-absorptive vitreous fibrous materials for acoustical insulating purposes is well known. Although such structures are widely used for interior wall and ceiling acoustical insulation, considerable effort has been expended to improve the appearance and to increase the wear resistance, the moisture resistance and the resistance to general atmospheric degradation of such materials. In the past, a number of methods have been utilized in order to improve the appearance of the acoustical product and to protect it from wear, scratching, staining, and the like. One of such methods was the lamination of a sheet of a hard, thermoplastic resin onto the fibrous acoustical board structure. Such method accomplished the desired result, but entailed complex engineering operations, since intricate, costly and complex machinery was needed to form the thermoplastic top sheet and to align and fasten it, by means of heat and pressure, to the fibrous acoustical board. Moreover, because of the pressures used in laminating, the thermoplastic top sheet was densified and thus cut down the attenuating and absorbing properties of the fibrous underlay structure. Further, much expense was incurred as a result of the damage and spoilage involved in handling and laminating the top sheet to the fibrous acoustical structure. Another method heretofore utilized to protect the acoustical tile or board was to encase the board in a smooth, reinforced plastic envelope. Such method, inherently, is subject to the same disadvantages as is the laminated sheet method, but, in addition, is more costly because of the increased resin necessary to form the envelope for the fibrous acoustical structure. Moreover, after the above-described articles have been completed, a serious problem has been encountered in regard to storage of the articles prior to shipment to consumers. As the articles issue from the curing ovens, they must be stored but, since the thermoplastic top sheet or plastic envelope is still warm and tacky, they cannot be stacked. When the articles are stacked, the tacky plastic covering of each of the articles, which are in contact with one another, fuse and coalesce and, upon cooling, cannot be separated without the destruction or serious marring of the plastic surfaces.

In view of the difficulties encountered by the prior art in attaining a low cost and effective method for protecting and improving the appearance of vitreous fibrous acoustical structures, it is a primary object of this invention to provide articles of commerce having sound absorbing and attenuating properties, having improved appearance and resistance to wear and having the capability of being easily maintained.

Another object of the invention is the provision of a novel coating composition which is permeable to sound waves, resistant to wear, easy to maintain and which imparts fire resistant properties to the article upon which it is coated.

Another object of the invention is the provision of a novel coating composition which is non-tacky after curing and before substantial cooling occurs, and which permits stacking of articles coated therewith.

Another object of the invention is to provide a method for preparing vitreous, fibrous acoustical structures and for applying a vinyl resin coating thereto wherein costly, complex machinery and complicated process steps are avoided.

SYNOPSIS OF THE INVENTION

In essence, the invention comprises the preparation of an aqueous dispersion comprising at least one thermoplastic resin and an additive which is a silicic acid or hydrosilicic acid, frequently called a silica sol (or equivalent), and preferably, in mixture with an alkaline salt of a fatty acid. The thermoplastic resin may be a polymer of vinyl acetate and an ethylenically unsaturated monomer polymerizable therewith either alone or in admixture with an unplasticized polymer of vinyl chloride. The aqueous slurry is applied, by spray-coating, to a fibrous board structure which has been precoated with an acoustical paint. In this way, the particular vinyl formulations, to be more fully set forth hereinafter, are not only easily and economically applied to the fibrous acoustical structure, but they may be applied in thinner films than by those methods in which the vinyl sheet must be preformed and subsequently applied to the fibrous substrate. After the fibrous base structure has been painted with acoustical paint and then spray-coated with the vinyl formulations of the invention, the coated boards are conveyed to an oven for heat treatment and the finished articles are then conveyed to storage areas where they are stacked, preparatory to shipment.

THE FIBROUS ACOUSTICAL BASE STRUCTURE

The body, tile or board of the vinyl-faced product may be formed of any type of fibers or material providing a porous structure but it is preferable to form same of mineral fibers, such as glass fibers, compressed to a suitable, predetermined density in order to render the body, tile or board substantially rigid.

Although the mats, boards and tiles may be produced in accordance with any number of known processes, one method which has been found satisfactory from an economical standpoint involves feeding glass into a blast of gas having a velocity sufficiently high to attenuate softened glass into fine fibers. The fibers are propelled by the force of the blast toward a traveling conveyor or screen, and are collected on the latter in the form of a mat. As the fibers build up on the conveyor a binder such as, for example, an A stage phenol-formaldehyde partial condensation product commonly known as a resole, is sprayed or otherwise applied to the fibers. The mass of fibers is then compacted by passing same between rollers, for example, and the binder is heat-treated at the temperature required in order to cure or set the binder and thus fasten the fibers together in the form of a coherent, structural mass. The heat treating operation is effected while the mass of fibers is held in the desired compacted condition in order to provide a mat of the proper rigidity and density.

Although resole binders as hereinbefore described are commonly used to fasten the fibers in the mass to each other, other fibrous glass bonding agents are well known and would be equally effective. For instance, instead of a resole there may be used binders composed of materials prepared by the reaction of compounds such as urea, melamine, dicyandiamide, and the like, with the phenol-formaldehyde partial condensation product. Other binder agents include epoxy, urea and polyester resins. The amount of binder to be included in the mat is discretionary, depending on the utility of the final product. Ordinarily, between about nine and sixteen percent binder, based on the weight of the board, is used depending on the balance desired between sturdiness and fire resistance. A weight of binder on the order of about 12 percent is generally considered a most satisfactory proportion.

A tile or board of mineral fibers of a density of about 11½ pounds per cubic foot and a thickness of from ½″ to about 1″ provides a rigid body suitable as an acoustical tile endowed with excellent acoustical or sound attenuating characteristics. Generally, however, a rigid board formed of such fibers may be of a density of from about 5 to 20 or 30 pounds per cubic foot and may be of any suitable thickness.

THE VINYL FORMULATION

In accordance with this invention, it has been found that the appearance and wear resistance of acoustical tile, such as those hereinbefore described, is improved by the application thereto of a plastic coating, which is non-tacky at temperatures as high as 150° F., comprising a latex which, preferably, contains a vinyl acetate multipolymer, a silica sol or equivalent and an alkaline salt of a fatty acid such as, for example, ammonium stearate. Although ammonium stearate is the preferred alkaline fatty acid salt, other materials may be used in lieu thereof. The ammonium salt of other high melting fatty acids such as, for example, myristic acid, palmitic acid, margaric acid, nondecyclic and arachidic acid may be used in accordance with the teachings of the invention. Further, there may be used, in lieu of the alkaline fatty acid salts, various of the well known high melting natural and synthetic emulsified waxes.

Although the coating composition, described in the preceding paragraph, is the preferred embodiment of the invention, other coating compositions, even though not the equivalent of the preferred compositions, in formulation or results, may be used with good results, so long as the composition contains the silica sol or equivalent, and, preferably the mixture of the silica sol and an alkaline salt of a fatty acid as set forth above. For example, an aqueous slurry comprising an unplasticized polymer of vinyl chloride resin, a vinyl acetate/acrylic acid ester or nitrile copolymer and the silica sol or equivalent or the mixture of silica sol or equivalent and alkaline fatty acid salt provides a satisfactory coating.

The silicic acid or silica sol is believed to be effective as what may be denominated an "anti-tack" or "anti-blocking" agent by what may be likened to a "powdering" phenomenon. The silica sol is, in essence, a suspension of sub-micron particles of silica in water. When the sol is added to a vinyl composition as indicated above, and as subsequently explained in more detail, and the resulting composition is applied to an acoustic product, the sub-micron silica particles collect preferentially at the exposed surface of the vinyl coating and provide for slippage and prevent "tackiness." Other inerts of sub-micron particle size, or even particles up to about 44 microns maximum, can be used in a similar manner. For example, silica smoke can be substituted directly for the silica sol, as can a commercially available titania sol, hydrated silica, or sub-micron calcium carbonate particles, and in the same proportions, based upon total solids. Hard, polyvinyl chloride resins, e.g., Geon 352,[1] are also anti-tack agents. Talc, e.g., up to about 44 microns maximum particle size is also an inert anti-tack agent, and, additonally acts as a "flatting" agent, but inert, sub-micron particles are most effective as anti-taick agents. Silica smoke is finely divided $SiO_2$ in extremely finely divided form: nominal particle size 250 angstroms, range 100 to 1000 angstroms. A commercially available grade of calcium carbonate having a particle size ranging from about 0.03 to about 0.05 micron is a suitable form of the indicated material. Baymal (AlOOH) in sub-micron particle size can also be used, and tends to make the vinyl compositions pseudo plastic in nature. This is desirable to a certain extent, but an excessive degree of pseudo plasticity can cause unnecessary processing complications.

As has been indicated above, the silica sol or equivalent can be used alone, but is preferably used in admixture with an alkaline fatty acid salt. In general, if a given amount of a silica sol or equivalent is the minimum necessary to achieve the required degree of "anti-tack" in a vinyl coating composition, when in admixture with an appropriate amount of an alkaline fatty acid salt, approximately 2 to 4 times that given amount of the silica sol or equivalent will be required to provide the required degree of "anti-tack" if the alkaline fatty acid salt is omitted. Since the silica sol is the more expensive ingredient, the use of the alkaline fatty acid salt is clearly indicated.

The polyvinyl chloride, the polyvinyl acetate/acrylic copolymer and the vinyl acetate multipolymer which are used in the invention are well known, as are their methods of manufacture. In order, however, to more fully describe the invention, a brief description of two methods of preparing such resins will be described.

One method of preparing the vinyl resins useful in the present invention is by the suspension polymerization process. In this method of preparation, a dispersion of the vinyl monomer in a non-solvent medium, such as water, is effected. The suspension of vinyl monomer in water is then agitated and subjected to polymerization conditions in the presence of a suspension stabilizing agent and a polymerization catalyst which is usually soluble in the vinyl monomer undergoing polymerization.

The second method of preparing the vinyl resins used in the invention is the emulsion polymerization process, wherein the vinyl monomer, water-soluble catalysts and polymerization modifiers are incorporated into an aqueous medium by use of a surfactant. Ordinarily, the monomer/water ratio is less than that of a suspension method of polymerization.

The above description of methods for preparing the resins used in this invention is not intended as a detailed teaching, since the methods are well known in the art. Further reference to the literature can be made for particulars.

Vinyl chloride polymer latices or beads are particularly useful as one component of the vinyl coating of the present invention, since they have the desirable physical properties and are inexpensive and readily available. In such vinyl chloride latices, in place of the unmixed vinyl chloride monomer, there may, of course, be employed mixtures thereof with other ethylenically unsaturated compounds copolymerizable therewith, such as vinyl fluoride, vinyl acetate and the like; esters and nitriles of alpha-unsaturated carboxylic acids such as methyl methacrylate, ethyl acrylate, acrylonitrile, dibutyl maleate, butyl methacrylate and the like; vinylidene compounds such as vinylidene chloride and vinylidene fluoride and the like; mono-unsaturated olefins such as ethylene, propylene, isobutylene and the like; and conjugated diole- ---
[1] Average particle size approximately 18 angstroms.

fins such as butadiene, isoprene, chloroprene, piperylene and similar materials. It is understood, of course, that the total quantity of comonomers should not be over 20 percent,[2] based on the weight of the copolymer, in order that the essential properties of the polyvinyl chloride structure are unchanged. Many polyvinyl chloride resins are generally known to those skilled in the art at this time and are available commercially as proprietary products and in the further description of the invention and the examples, commercial resins, such as that known by the trademark "Geon" 352 (an unplasticized polyvinyl chloride in latex form, B. F. Goodrich Chemical Co., Cleveland, Ohio) are used.

A polymer of vinyl acetate and a nitrile or ester of acrylic or methacrylic acid is used in conjunction with the polyvinyl chloride resin. Exemplary monomers which may be polymerized with the vinyl acetate are ethyl acrylate, methyl acrylate, methyl chloroacrylate, acrylonitrile, methacrylonitrile, butyl methacrylate and the like, although any ethylenically unsaturated monomer copolymerizable therewith may be used. These resins are also generally known to those skilled in the art at this time and available commercially and in the further description of the invention, such commercial latices as Polychem Co–60–30NS and Polychem Co–30–55NS (55 percent solids, Ohio Polychemical Company, Columbus, Ohio) are used. Other commercially available polyvinyl acetate multipolymer latices which are used in accordance with the invention are Gelva 900 (46 percent solids, Shawinigan Resins Corp., Springfield, Mass.) and Hycar 2600X112 (50 percent solids, B. F. Goodrich Chemical Co., Cleveland, Ohio).

There is used, as the preferred embodiment, a vinyl acetate multipolymer latex such as Gelva E–900 together with a mixture of silicic acid and an alkaline salt of a fatty acid, such as ammonium stearate.

In addition to the components described above, the coating composition may contain other materials necessary for optimum processing and coating properties. For instance, in preparing the coating formulation there will be included anti-foaming agents such as pine oil, propylene glycol ricinoleate, octyl alcohol, diglycol laurate, and the like. Also included will be pigments, flatting agents such as talc and ultrafine silica, both of which also function as anti-blocking or anti-tack agents, as well, pigment dispersing agents such as tetrasodium pyrophosphate, and resin dispersing agents and surfactants such as "Triton" X–100 (isooctyl phenyl polyethoxy ethanol, Rohm & Haas Co., Philadelphia, Pa.), aromatic sulfonate-oxide condensates, polyoxyethylated vegetable oils and other conventional wetting agents. Additionally, fungicidal agents such as phenylmercuric acetate may be included, as well as dyes and other coloring agents; protective colloids such as hydroxy-ethylcellulose; light stabilizers such as phenyl phthalate and o-nitrophenol; conventional fillers and the like. Fire retardants such as sodium borate-boric acid complexes and hydrated alumina (which also perform a secondary function as an anti-tack agent) can also be used. The examples hereinafter set forth illustrate specific embodiments of vinyl coating formulations which are used in accord with the objects of the invention. It is understood, of course, that the examples are intended only to demonstrate, but not limit, the scope of the invention.

EXAMPLE 1

| Ingredients: | Amount (pounds) |
|---|---|
| Daxad 30 | 9.0 |
| Hydroxyethylcellulose | 13.5 |
| Aluminum hydrate | 360.0 |
| Talc | 135.0 |
| "Gelva" E–900 | 1150.0 |
| "Triton" X–100 | 13.5 |
| Anti-foam agent | 13.5 |
| Phenylmercuric acetate | 4.5 |
| Ammonia | 15.0 |
| Silica sol | 340.0 |
| Ammonium stearate (5%) | 210.0 |

EXAMPLE 2

| Ingredients: | Amount (pounds) |
|---|---|
| Tetrasodium pyrophosphate | 37 |
| Zeothix 60 (hydrated silica) | 100 |
| Sodium borate-boric acid complex | 150 |
| Anti-foam agent | 5 |
| "Triton" X–100 | 37 |
| "Gelva" E–900 | 1275 |
| Geon 352 | 525 |
| Phenylmercuric acetate | 3.5 |

EXAMPLE 3

| Ingredients: | Amount (pounds) |
|---|---|
| Tetrasodium pyrophosphate | 37 |
| Zeothix 60 | 100 |
| Sodium borate-boric acid complex | 150 |
| Anti-foam agent | 5 |
| Triton X–100 | 37 |
| Polychem Co–60–30NS | 850 |
| Geon 352 | 850 |
| Phenylmercuric acetate | 3.5 |

EXAMPLE 4

| Ingredients: | Amount (pounds) |
|---|---|
| Tetrasodium pyrophosphate | 37 |
| Zeothix 60 | 100 |
| Sodium borate-boric acid complex | 150 |
| Anti-foam agent | 5 |
| Triton X–100 | 137 |
| Hycar 2600 X–112 | 850 |
| Geon 352 | 850 |
| Phenylmercuric acetate | 3.5 |

EXAMPLE 5

| Ingredients: | Amount (pounds) |
|---|---|
| Tetrosodium pyrophosphate | 37 |
| Zeothix 60 | 100 |
| Sodium borate-boric acid complex | 150 |
| Anti-foam agent | 5 |
| Triton X–100 | 37 |
| Polychem Co–30–55 | 850 |
| Geon 352 | 850 |
| Phenylmercuric acetate | 3.5 |

As stated hereinabove, "Daxad" 30, "Triton" X–100, Geva E–900, Polychem Co–60–30NS, Polychem Co–30–55, Hycar 2600 X–112 and "Geon" 352 are generally known to those skilled in the art and are available commercially at this time. Such materials are described in the manufacturer's technical bulletins and may, at this time, be ordered from the manufacturers.

Silica smoke can be substiuted for the silica sol of Example 1, as can other sub-micron inert solids, and even such solids up to about 44 microns in particle size. Based on the weight of the ingredients, exclusive of water, in the formulation, the amount of silica sol may vary from about 5 percent to about 20 percent and the amount of alkaline fatty acid salt may vary from about 0.01 percent to about 3 percent.

A preferred vinyl coating was prepared from the ingredients illustrated in Example 1 in the following manner. The surfactant, hydroxylethyl cellulose, aluminum hydrate and talc were charged, with 200 gallons of water, to an appropriate mixing tank provided with a high speed dispersing agitator. The mixture was then mixed until the ingredients were well dispersed. The vinyl acetate polymer (Gelva E–900), the "Triton" X–100, the anti-foam agent, the phenylmercuric acetate, the ammonia, the silica

---

[2] The terms "percent" and "parts" are used herein to refer to percent and parts by weight, unless otherwise indicated.

sol and the ammonium stearate were then charged to the dispersion and an additional 88 gallon portion of water was then added. The total dispersion was then mixed again, until all ingredients appeared to be well-dispersed, and then fed to conventional spraying apparatus.

Vinyl coatings were prepared from the ingredients illustrated in Examples 2 through 5 in the following manner: The tetrasodium pyrophosphate dispersing agent and the silica flatting agent were charged, with 100 gallons of water, to an appropriate mixing tank provided with a high speed dispersing agitator. The mixture was then mixed for 10 minutes to insure complete dispersion and an additonal 193-gallon portion of water was then added. The sodium borate-boric acid complex, the anti-foaming agent, the surfactant, the phenylmercuric acetate and the polyvinyl chloride and polyvinyl acetate/acrylic resins were then added to the dispersion. The total dispersion was then mixed at low speed for an additional 10 minutes and then fed to conventional spraying apparatus.

The coating compositions prepared as described above, were then spray-coated on acoustical base boards which were prepared as follows:

A phenolic resole binder was prepared having a solids content of about 8 percent. The binder composition was sprayed into a forming hood through which glass fibers were being projected into a foraminous conveyor. The fibers were collected in the form of a randomly intermeshed wool-like mass associated with the binder composition. The relative proportion of associated binder was such that the binder, after cure, constituted slightly in excess of 10 percent of the total wool-like mass. Cure was accomplished in an oven maintained at a temperature of about 450° F. in which the glass fibers and associated binder were exposed for about 5 minutes by passage therethrough and within which the mass was compressed sufficiently that one-half inch thick boards having apparent densities of about 10½ pounds per cubic foot were produced. Tiles 12 inches square were cut from the boards and coated with a conventional acoustical paint.

In addition to the phenolic or other resinous binder, the completed mass of fibers may also contain a certain amount of inorganic binder material having fire resistant properties. For instance, supplementary inorganic binders composed of an aqueous clay slurry incorporating various processing components may be applied to the bonded mass.

Either the organic resin binder and/or supplementary binder may contain conventional additives such as pigments, fillers, dyes, plasticizers, extenders and the like.

Acoustical base boards, of the type prepared above, were then spray-coated on one side thereof with the vinyl formulations of Examples 1 through 5 and passed through a curing oven at a temperature within the range of about 250° F. to 350° F. and preferably about 300° F., so as to set the thermoplastic vinyl coating. Upon emerging from the oven, the coated base boards were non-tacky while still at temperatures as high as 150° F. and could be easily stacked. No destruction or marring of the coated surfaces was noted upon separation of stacked boards after cooling. Because of the vinyl spray coating, the boards were wear-resistant, moisture-resistant and presented a smooth-faced surface which was either transparent or colored depending on the required appearance of the final installation.

The thickness of the surface coating and of the acoustical base board itself will vary, depending upon the ultimate use of the acoustical base board. For instance, the vinyl coating may vary in thickness from less than 1 mil to 8 or more mils, and preferably from about 0.15 mil to 3 mils. Such thickness is controlled by varying the amount of coating formulation issuing from the spraying apparatus, and by varying the amount of solids present in the resin dispersion. The thickness of the base board will depend upon whether the board is to be used primarily for decorative purposes, whether noise reduction is a primary goal or whether noise reduction and fire resistance are contemplated. Obviously, the board may be on the order of ½ inch thick if it is to be used only for decorative purposes. Depending on the amount of noise reduction desired and whether fire resistance is an additional characteristic desired, the thickness of the board may be increased such as, for example up to about 2 inches.

Since the vinyl coating is transparent, the appearance of the board will depend on its treatment prior to being coated. For instance, the acoustical paint, with which the board is first coated, may contain flocculent materials so as to present a textured appearance and may, in lieu of or in addition to the flocculent materials, contain metallic flakes and the like. The coatings applied in accordance with this invention are hard, firmly adherent, moisture impervious but sound permeable and faithfully reproduce the surface of the finished acoustical board. Thus, if the board has been polished or smoothed in some manner, and then coated with acoustical paint, the coating will have a smooth, glossy appearance. If the board surface has been treated, such as by frosting, embossing, texturing or the like, either before or after the acoustical paint coat, the vinyl coating will reproduce such surface treatment.

It is within the scope of the invention to spray coat more than a single side of the acoustical base board. Where, for example, the base board is to be used in an installation such as an office partition, both sides of the board may be spray coated so as to present a decorative effect and increase the wear resistance thereof. Base boards of proper thickness can, for example, be used as a sole partitioning structure material when disposed in a framework of plastic, metal or the like.

What we claim is:

1. The method of preparing a spray-coated, vinyl-faced fibrous acoustical insulating member which comprises forming an uncompacted mat of glass fibers and an associated resinous binder, applying pressure in order to compact said mass to a predetermined apparent density, heat-treating said mass of fibers having said resinous binder incorporated therein in order to form thereof a board-like structural member, coating at least one surface of said member with acoustical paint, spraying onto said painted surface of said structural member a coating dispersion comprising at least one theremoplastic vinyl resin and as an anti-tack additive material, inert particles selected from the group consisting of silica sol, silica smoke, titania sol, hydrated silica, calcium carbonate, hard polyvinyl resin particles and talc, wherein the particles are not greater than about 44 microns in size, in an amount sufficient to make the resin non-tacky at temperatures up to about 150° F., and in proportion to constitute from 5 to 20 percent by weight of the coating dispersion, on a dry solids basis, the remainder of said coating dispersion consisting essentially of the thermoplastic resin, heat-treating the coated member at a temperature of about 250° to 350° F. and controlling the spraying of the dispersion so that the coating, after heat treating, is from about 0.15 to 3 mils in thickness.

2. The method claimed in claim 1, wherein the thermoplastic resin is a vinyl acetate polymer and a monomer polymerizable therewith, and the anti-tack additive comprises a silica sol.

3. The method claimed in claim 2, wherein the dispersion of the thermoplastic resin additionally contains from about 0.01 to 3 percent by weight of an alkaline salt of a fatty acid, on a dry solids basis.

4. An article of manufacture comprising a fibrous acoustical insulating member having an apparent density of from about 5 to 30 pounds per cubic foot and having at least one surface thereof coated with an acoustical paint, and the exposed surface of the acoustical paint being coated with a layer of a moisture impervious, sound permeable thermoplastic resin composition, said layer having a thickness from about 0.15 to 3 mils and comprising at least one thermoplastic vinyl resin and, as an anti-tack additive material, inert particles not greater than about 44 microns in size said particles constituting from 5 to 20 percent by weight of the coating being selected from the group consisting of silica sol, silica smoke, titania sol, hydrated silica, calcium carbonate, hard polyvinyl resin particles and talc and being present in an amount sufficient to make the resin non-tacky at temperatures up to about 150° F., and the remainder of said coating layer consisting essentially of the vinyl resin.

5. An article as claimed in claim 4 wherein the thermoplastic resin is a vinyl acetate polymer and an ethylenically unsaturated monomer polymerizable therewith, and the anti-tack additive comprses a silica sol.

6. An article as claimed in claim 5, wherein the layer of the thermoplastic resin additionally contains from about 0.01 to 3 percent by weight of an alkaline salt of a fatty acid.

References Cited

UNITED STATES PATENTS

| | | |
|---|---|---|
| 2,046,296 | 6/1936 | Roos et al. |
| 2,408,654 | 10/1946 | Kirk _____ 252—309 |
| 2,855,327 | 10/1958 | Gilchrist et al. _____ 117—72 X |
| 2,941,899 | 6/1960 | Stalego _____ 117—72 X |
| 2,979,417 | 4/1961 | Kruger et al. _____ 117—167 X |
| 3,083,133 | 3/1963 | Hansen et al. |
| 3,239,475 | 3/1966 | Clark _____ 260—17 |
| 3,287,290 | 11/1966 | Bray _____ 260—17 |

ALFRED L. LEAVITT, Primary Examiner

C. R. WILSON, Assistant Examiner

U.S. Cl. X.R.

117—126, 161; 161—170; 264—109, 130; 181—33